United States Patent [19]

Boomgaard et al.

[11] 4,279,800
[45] Jul. 21, 1981

[54] HIGH SOLIDS PIGMENTED COATING COMPOSITION CONTAINING A BLEND OF ESTER DIOLS AND A CURING AGENT

[75] Inventors: Ritse E. Boomgaard, Oegstgeest; Roelof Buter, Dieren; Aleidus A. Kiffen, Angerlo, all of Netherlands

[73] Assignee: Akzo NV, Arnhem, Netherlands

[21] Appl. No.: 140,482

[22] Filed: Apr. 15, 1980

[30] Foreign Application Priority Data

Apr. 19, 1979 [NL] Netherlands ............. 7903056

[51] Int. Cl.$^3$ .................. C08L 61/28; C08L 67/02
[52] U.S. Cl. ................. 260/39 P; 260/39 M; 528/83; 525/440; 525/444; 525/519
[58] Field of Search ............ 525/443, 444, 519; 260/39 P, 39 N; 528/83, 273

[56] References Cited

U.S. PATENT DOCUMENTS

| | | | |
|---|---|---|---|
| 3,678,128 | 7/1972 | Riemhofer et al. | 525/443 |
| 3,819,757 | 6/1974 | Dörffel et al. | 525/443 |
| 3,852,375 | 12/1974 | Biethan et al. | 525/443 |
| 3,857,817 | 12/1974 | Henshaw et al. | 260/39 R |
| 4,101,496 | 7/1978 | Dörffel et al. | 260/31.2 R |
| 4,104,240 | 8/1978 | Buter | 260/39 P |
| 4,189,452 | 2/1980 | Haddad et al. | 525/444 |

*Primary Examiner*—Theodore E. Pertilla
*Attorney, Agent, or Firm*—Stevens, Davis, Miller & Mosher

[57] ABSTRACT

A pigment-containing high solids coating composition is prepared from a blend of ester diols as binder and a curing agent for the binder, characterized in that as ester diol there is used a mixture of (a) 20-80 mole % of a compound having the general formula:

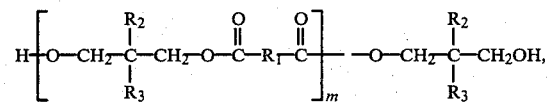

where $R_1$ represents the group formed by abstraction of the two carboxyl group from a cycloaliphatic and/or aromatic dicarboxylic acid having 8 to 20 carbon atoms and $R_2$ and $R_3$ may be the same or different and represent a hydrogen atom and/or a hydrocarbon group having 1 to 9 carbon atoms, and m is a number of 1-4, and of (b) 80-20 mole % of a compound having the general formula

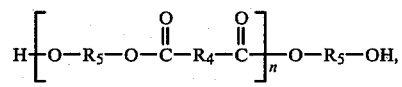

where $R_4$ represents the group formed by abstraction of the two carboxyl groups from a cycloaliphatic and/or aromatic dicarboxylic acid having 8 to 20 carbon atoms, and $R_5$ represents the group formed by abstraction of the two carboxyl groups from a cycloaliphatic and/or to 12 carbon atoms in the main chain, and n is a number of 1-4.

8 Claims, No Drawings

HIGH SOLIDS PIGMENTED COATING COMPOSITION CONTAINING A BLEND OF ESTER DIOLS AND A CURING AGENT

The invention relates to a pigment-containing high solids coating composition prepared from a blend of ester diols and a curing agent. A composition of this type prepared from one diester diol is known from U.S. Pat. No. 3,857,817; the dicarboxylic acid used for the preparation of the diester diol is either an aromatic dicarboxylic acid such as terephthalic acid, or an aliphatic dicarboxylic acid. It has been found that if such a composition does not contain a pigment, the resulting coating displays both sufficient hardness and sufficient flexibility. If, however, the composition does contain a pigment, which is mostly the case, then the coating is either insufficiently hard or insufficiently flexible. Further, U.S. Pat. No. 4,104,240 proposes the use of a pigment-containing coating composition based on a mixture of at least 2 ester diols which provides coatings that do have a high hardness and a high flexibility. The one ester diol must be built up then from a particular cycloaliphatic or aromatic dicarboyxlic acid and the other ester diol from a particular aliphatic dicarboxylic acid; the alcohol component of the ester diols is always an arbitrarily chosen divalent alcohol containing 2 to 12 carbon atoms. It has been found, however, that although after curing this known coating composition has favourable mechanical properties, its chemical resistance and durability still need to be improved, because it can as yet only be used mainly as a primer or a filler.

An object of the invention is to provide a coating composition of the above-described type which after curing has a very good chemical resistance and satisfactory durability, as well as a high hardness and a high flexibility. Consequently, the present coating composition is not only very suitable to be used as a primer or a filler, but also as a top coat. More particularly, the coating composition is suitable to be used as automobile paint.

The coating composition according to the invention is characterized in that as ester diol there is used a mixture of (a) 20–80 mole % of a compound having the general formula

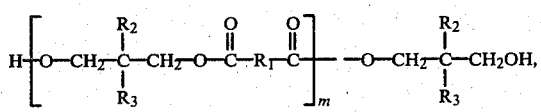

where $R_1$ represents the group formed by abstraction of the two carboxyl groups from a cycloaliphatic and/or aromatic dicarboxylic acid having 8 to 20 carbon atoms and $R_2$ and $R_3$ may be the same or different and represent a hydrogen atom and/or a hydrocarbon group having 1 to 9 carbon atoms, and m is a number of 1–4, and of (b) 80–20 mole % of a compound having the general formula

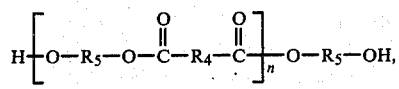

where $R_4$ represents the group formed by abstraction of the two carboxyl groups from a cycloaliphatic and/or aromatic dicarboxylic acid having 8 to 20 carbon atoms, and $R_5$ represents the group formed by abstraction of the two hydroxyl groups from a terminal diol having 4 to 12 carbon atoms in the main chain, and n is a number of 1–4.

By high solids coating compositions are to be understood here compositions having a solids content of at least 65% by weight and preferably at least 70% by weight. The solids content is determined in conformity with ASTM method D 1644-59 upon heating for 1 hour at 105° C.

The mixture of ester diols according to the invention comprises an ester diol which may be built up from one or more particular cycloaliphatic or aromatic dicarboxylic acids, an anhydride or an alkyl ester thereof, the alkyl group generally containing 1 to 4 carbon atoms, and from one or more particular propane diols.

Suitable cycloaliphatic or aromatic dicarboxylic acids or derivatives thereof include tetrahydrophthalic acid, tetrahydrophthalic anhydride, endomethylene tetrahydrophthalic acid, hexachloroendomethylene tetrahydrophthalic acid, hexahydrophthalic acid, hexahydroterephthalic acid, phthalic acid, p-carboxymethyl benzoic acid, dichlorophthalic acid, tetrachlorophthalic acid, dimethyl terephthalate, dimethylhexahydroterephthalate, naphthalene-2,6-dicarboxylic acid and biphenyl-o,o'-dicarboxylic acid. It is preferred that use should be made of one or more dicarboxylic acids having 8 to 10 carbon atoms, for example isophthalic acid and terephthalic acid.

Representative diols include propane-1,3-diols having in the 2-position an alkyl group containing 1–4 carbon atoms, an aryl group, for instance a phenyl group, or a cycloaliphatic group, for instance a cyclohexyl group. As examples of suitable diols may be mentioned propane-1,3-diol, 2,2-dimethyl propane-1,3-diol, 2-methyl-2-n.propyl propane-1,3-diol, 2-methyl-2-phenyl propane-1,3-diol, 2-ethyl-2n-butyl propane-1,3-diol, 2-propyl-2-n.butyl propane-1,3-diol, 2-methyl-2-cyclohexyl propane-1,3-diol, 2-methyl2-tolyl propane-1,3-diol, 2-methyl-2-p.isopropyl-phenyl propane-1,3-diol. It is preferred that use should be made of propane-1,3-diols which have in the 2-position at least one alkyl group containing 1 to 4 carbon atoms, more particularly 2,2-dimethyl propane-1,3-diol. The above-described ester diols will be referred to hereinafter as "branched propylene ester diol".

The mixture of ester diols according to the invention also comprises an ester diol which may be built up from one or more particular cycloaliphatic and/or aromatic dicarboxylic acids, an anhydride or an alkyl ester thereof, the alkyl group generally containing 1 to 4 carbon atoms, and from one or more terminal diols having 4 to 12 carbon atoms in the main chain.

The dicarboxylic acids or derivatives thereof to be used in the preparation of this type of ester diol may be the same as those used in the preparation of the branched propylene ester diol, but not at all necessarily. As examples of representative terminal diols may be mentioned: butane-1,4-diol, pentane-1,5-diol, 3-methyl pentane-1,5-diol, hexane-1,6-diol, 2,2,4-trimethyl hexane-1,6-diol, 2,4,4-trimethyl hexane-1,6-diol, heptane-1,7-diol, octane-1,8-diol, decane-1,10-diol and dodecane-1,12-diol. The afore-described ester diols are referred to hereinafter as "higher alkylene ester diol".

The number average molecular weight of the branched propylene ester diol and the higher alkylene ester diol is generally in the range of 282 to 2000 and 310 to 2000, respectively, and preferably in the range of 310 to 1000 and 400 to 1200, respectively.

The ester diols to be used according to the invention may be prepared in any convenient manner. For instance one or more diols may be caused to react with one or more dicarboxylic acids, an anhydride and/or an alkyl ester thereof in a molar ratio of the order of 1½–2:1. The esterification reaction takes place at elevated temperature, for instance at 115° to 250° C., in the presence, if desired, of one or more organic solvents, such as toluene or xylene. It is preferred that the reaction should be so carried out that the average number of ester groups per molecule of the prepared ester diol is in the range of 2 to 6 (m or n 1 to 3).

The reaction will generally be carried out in the presence of an esterification catalyst of a usual concentration. The catalyst may be of the usual type and may for instance be an acid catalyst such as p-toluene sulphonic acid, a basic compound such as an amine or compounds such as zinc oxide, tetraisopropyl orthotitanate and triphenyl benzyl phosphonium chloride.

According to the invention the molar ratio of the branched propylene ester diol to the higher alkylene ester diol is generally between 8:2 and 2:8, and preferably between 3:1 and 1:3, and more particularly between 2:1 and 1:2.

The ester diols may be intermixed in any convenient manner; for instance by first separately preparing the ester diols and subsequently intermixing them. Another suitable method consists in preparing one of the ester diols in the presence of the other ester diol or ester diols.

Depending on the method used for preparing the ester diols other esterification products may have formed in small amounts and be present in the ester diols according to the invention. Such additional esterification products usually are the higher molecular reaction products of the employed dicarboxylic acids and diols or derivatives of these compounds, for instance: esterification products having 9 to 12 ester groups. As a rule, the ester diols according to the invention contain not more than about 5% by weight and often less than 1% by weight of such higher molecular esterification products.

As curing agent for the mixture of ester diols according to the invention there may be used any curing agent suitable for curing a compound containing hydroxyl groups. Suitable curing agents generally include N-methylol groups and/or N-methylol ether groups-containing amino resins obtained by reacting an aldehyde, such as formaldehyde, with a compound containing amino groups or amido groups, such as melamine, urea, N,N'-ethylene urea, dicyandiamide and benzoguanamine; for the preparation of such compounds, see Houben-Weyl, Methoden der organischen Chemie, Band 14/2, pp. 319–371 (1963). It is preferred that the aforedescribed compounds should entirely or partly be etherified with alcohols having 1 to 6 carbon atoms, for instance with methanol, ethanol, n-propanol, isopropanol, n-butanol, isobutanol, amyl alcohol, hexanol or mixtures of the alcohols referred to above. Particularly, use is made of a methylol melamine containing 4 to 6 methylol groups per molecule of melamine, at least 3 methylol groups being etherified with methanol, ethanol, propanol or butanol, or a butanol-etherified condensation product of formaldehyde and N,N'-ethylene diurea. More particularly, use is made of a hexalkoxymethyl melamine whose alkoxy group contains 1 to 4 carbon atoms. Instead of or besides the above-described curing agents other suitable agents may be used, such as blocked or nonblocked polyisocyanates.

The curing agent is generally used in such an amount that the molar ratio of the hydroxyl groups of the ester diol mixture to the reactive groups of the curing agent is approximately between about 0.7 and 1.5 and preferably between 0.8 and 1.3.

The coating composition may further contain usual intermediate agents and additives, such as pigment dispersing agents, thixotropic agents or other means to influence the rheological properties, colourants, solvents and accelerators for the curing reaction, for instance acid compounds such as p-toluene sulphonic acid or blocked products thereof.

In any case the coating composition contains one or more pigments in a total amount of at least 10% by weight, and preferably 15–35% by weight, and in general 100% by weight, calculated on the total ester diol content of the coating composition. Suitable pigments include the usual kinds, namely acid, neutral or basic pigments which may be of an organic or an inorganic nature. If desired, the pigments may have been pretreated to modify the properties. As examples of suitable pigments may be mentioned titanium dioxide, iron oxide red, carbon black and phthalocyanin pigments. By pigments are also to be understood here metallic pigments such as those of aluminium and stainless steel. The coating composition ready for use generally has a viscosity not higher than 2 Pa.s, and preferably between 50 m Pa.s and 1 Pa.s.

The coating composition may be applied to the substrate in any desirable way, for instance by roller coating, spraying, brushing, sprinkling, flow-coating, dipping or electrostatic spraying.

Further, the coating composition may be cured or baked in the usual manner, for instance at ambient temperature or at the usual temperatures between, say, 100° and 160° C., in a residence time of 20 to 60 minutes in a baking oven.

Preparation of ester diols.

EXAMPLE A

The following materials were charged into a reactor equipped with a stirrer, a thermometer and a condenser: 3900 grammes of 2,2-dimethyl propane-1,3-diol, 2700 grammes of phthalic anhydride and 1 gramme of tetraisopropyl orthotitanate. The mixture was heated to a temperature slightly above 170° C., upon which the water formed in the esterification reaction began to flow over. During the reaction 338 grammes of water were distilled off, the temperature rising to 240° C. The ester diol prepared contained on an average 2,5 ester groups per molecule and will hereinafter be referred to as di(neopentyl glycol) phthalate.

EXAMPLE B

Into a reactor provided with a stirrer, a thermometer and a condenser there were successively charged 1940 grammes of dimethyl terephthalate, 3200 grammes of a mixture of equal parts by weight of 2,2,4-trimethyl hexane-1,6-diol and 2,4,4-trimethyl hexane-1,6-diol and 1 g of tetraisopropyl orthotitanate. The mixture was heated to a temperature slightly above 150° C., upon which the methanol formed in the trans-esterification reaction began to flow over. During the reaction 641 grammes of methanol were distilled off, the temperature rising to 210° C. After the ester diol prepared had been cooled, it could be used as such and contained on an average 2,5 ester groups per molecule and is hereinafter referred to as di(trimethyl hexane diol)terephthalate.

EXAMPLE C

Into a reactor provided with a stirrer, a thermometer and a condenser there were successively charged: 4602 grammes of 3-methyl pentane-1,5-diol, 4316 grammes of isophthalic acid and 1 gramme of tetraisopropyl orthotitanate. The mixture was heated to a temperature slightly above 170° C., upon which the water formed in the esterification reaction began to flow over. During the reaction 936 grammes of water were distilled off, the temperature rising to 240° C. After the reaction product had been cooled, it could be used as such. The ester diol prepared contained on average 4,2 ester groups per molecule and is referred to hereinafter as tetra(methyl pentane diol)isophthalate.

EXAMPLE D

The procedure of Example A was repeated, except that instead of the phthalic anhydride 2810 grammes of hexahydrophthalic anhydride were used. The ester diol prepared contained on an average 2,5 ester groups per molecule and is referred to hereinafter as di(neopentyl gylcol)hexahydrophthalate.

EXAMPLE E

The procedure of Example A was repeated, except that instead of the 2,2-dimethyl propane-1,3-diol 3375 grammes of butane-1,4-diol were used. The ester diol prepared contained on an average 2,5 ester groups per molecule and is referred to hereinafter as di(butane diol)phthalate.

EXAMPLE F

The procedure of Example A was repeated, with the exception that instead of the phthalic anhydride 1790 grammes of maleic anhydride were used. The ester diol prepared contained on an average 2,5 ester groups per molecule and is referred to hereinafter as di(neopentylglycol)maleinate.

EXAMPLE G

The procedure of Example C was repeated, except that instead of the 3-methyl pentane-1,5-diol 4680 grammes of butane-1,4-diol were used. The ester diol prepared contained on an average 2,4 ester groups per molecule and is referred to hereinafter as di(butane diol)isophthalate.

EXAMPLE H

The procedure of Example C was repeated, except that instead of the 3-methyl pentane-1,5-diol 6864 grammes of 2-methyl-2-n.propyl propane 1,3-diol were used. The ester diol prepared contained on an average 2,5 ester groups per molecule and is referred to hereinafter as di(methylpropyl propane diol)isophthalate.

In the following comparative examples and the other examples, which are not to be interpreted as limiting the scope of the present invention, the Persoz hardness is measured and expressed in seconds. The flexibility is determined with the aid of the "Falling-weight" tester (Erichsen-type 304) in accordance with ASTM D 2794-69, using a weight of 0.908 kg measuring 15.9 mm in diameter and a dropping opening of 16.3 mm, the value obtained being expressed in kg-cm. In accordance with this method the values were determined both for the coated side and the back of the phosphatized steel test panel (Bonder 120). Moreover, the conical mandrel test was carried out, its results being expressed in mm.

An acceptable minimum value of the hardness is about 200 seconds. An acceptable minimum value of the flexibility is of the order of 35 kg-cm, the highest value to be measured being 85 kg/cm. The conical mandrel test (carried out in accordance with ASTM D 522-41) gives a value below the lower measuring value 1 in the case of very flexible coatings; a value of 104 in this test is indicative of the coating being very brittle.

The gloss was determined at 60° and at 20° (ASTM D-523). A gloss value above 90 at 60° is considered very high. A gloss value above 80 at 20° is also regarded as high. The values of the measured properties are listed in Table 1.

The chemical resistance is determined by the Kesternich test in accordance with DIN 50018 (with 2 l $SO_2$), the degree of surface attack by $SO_2$ being indicated. A high value is indicative of high chemical resistance, a low value of low chemical resistance. The scale range is of from 0 to 10. The durability is determined by the usual Weather-O-Meter test (WOM-test), using a carbon arc and a cycle 17/3. The evaluation is carried out by determining the gloss at 60° after a period of 500 hours. A value of 80 is very good; a value of about 40 is unacceptable. Finally, the gloss retention is measured at 60° after 1 year exposure in Florida with the coated object facing south while positioned at an angle of 5° to the horizontal. The gloss retention is indicated as the ratio of the gloss value after exposure to the original gloss value (expressed as percentage). The measured values are given in Table 2.

The sprayable compositions described in the comparative examples and in the other examples all have a viscosity of 25 seconds at 20° C. (Ford cup No. 4). The resulting coating (after baking) had the thickness given in Table 1.

EXAMPLES

Comparative Example 1

The following components were homogeneously mixed:

| | |
|---|---|
| di(neopentyl glycol)phthalate | 260 g |
| (prepared in accordance with Example A) | |
| hexamethoxymethyl melamine | 130 g |
| 20% solution of p-toluene sulphonic acid in isopropanol | 10 g |
| titanium dioxide | 282 g |
| mixture of equal parts by weight of xylene and ethylglycol acetate | 133 g |

The resulting pigmented coated composition was applied to a steel panel treated with zinc phosphate (Bonder 120) and cured for 30 minutes at a temperature of 130° C. The coating obtained had a good hardness, but was very brittle (see also Table 1).

Comparative Example 2

In the same way as described in Comparative Example 1 a pigmented composition based on tetra(methyl pentane diol)isophthalate was tested. The coating composition was made up of the following ingredients:

| | |
|---|---|
| tetra(methyl pentane)isophthalate | 290 g |
| (prepared in accordance with Example C) | |
| hexamethoxymethyl melamine | 100 g |
| 20%-solution of p-toluene sulphonic acid in isopropanol | 10 g |

| titanium dioxide | 282 g |
| --- | --- |
| a mixture of equal parts by weight of xylene and ethylglycol acetate | 92 g |

It was found that although the baked pigmented coating had a high flexibility, but its hardness was insufficient (see also Table 1).

Comparative Example 3

Into a reactor provided with a stirrer, a thermometer, a reflux condenser and a dropping funnel there were charged 1661 grams of isophthalic acid. The reactor was subsequently heated to 150° C., after which a mixture of 1276 grams of propylene oxide and 3 grams of triphenyl benzyl phosphonium chloride were added so slowly that a steady reflux at 150° C. was maintained. After the entire mixture had been added, the temperature was for one more hour kept at 150° C. After completion of the reaction the small excess of propylene oxide was removed in vacuo. The ester diol prepared had on an average 2.4 ester groups per molecule and is hereinafter referred to as di(propane-1,2-diol)isophthalate.

In the preparation of an ester diol that will hereinafter be referred to as di(propane-1,2-diol)adipate, the following materials were charged into a reactor equipped with a stirrer, a thermometer and a condenser: 1461 grams of adipic acid, 3044 grams of propane-1,2-diol, 4 grams of zinc oxide. The mixture was heated to a temperature slightly above 150° C., upon which the water formed in the esterification reaction began to flow over. During the reaction 360 grams of water were distilled off, the temperatur rising to 180° C. After the temperature had subsequently been decreased to 90° C., the excess of propane-1,2-diol (1522 grams) was distilled off in vacuo. The ester diol prepared contained on an average 2.5 ester groups per molecule.

The following components were homogeneously mixed:

| di(propane-1,2-diol)isophthalate | 98 g |
| --- | --- |
| di(propane-1,2-diol)adipate | 138 g |
| hexamethoxymethyl melamine | 114 g |
| a 20% solution of p-toluene sulphonic acid in isopropanol | 9 g |
| titanium dioxide | 240 g |
| a mixture of equal parts by weight of xylene and ethylglycol acetate | 90 g |

The baked coating composition had both a good hardness and a good flexibility, but unacceptable chemical resistance and durability (see the Tables 1 and 2).

EXAMPLE I

The following components were homogeneously mixed:

| di(neopentyl glycol)phthalate (prepared in accordance with Example A) | 138 g |
| --- | --- |
| tetra(methyl pentane diol)isophthalate (prepared in accordance with Example C) | 138 g |
| hexamethoxymethyl melamine | 114 g |
| a 20%-solution of p-toluene sulphonic acid in isopropanol | 10 g |
| titanium dioxide | 282 g |
| a mixture of equal parts by weight of xylene and ethylglycol acetate | 113 g |

The sprayable composition was applied to a steel panel treated with zinc phosphate (Bonder 120) and cured for 30 minutes at a temperature of 130° C. The baked coating had good mechanical and other properties (see the Tables 1 and 2).

EXAMPLE II

The procedure of Example I was repeated, except that the ratio of di(neopentyl glycol)phthalate to tetra(methyl pentane diol)isophthalate was changed from 1:1 into 2:3. The following components were homogeneously mixed:

| di(neopentyl glycol)phthalate | 104 g |
| --- | --- |
| tetra(methyl pentane diol)isophthalate | 174 g |
| hexamethoxymethyl melamine | 112 g |
| 20%-solution of p-toluene sulphonic acid in isopropanol | 10 g |
| titanium dioxide | 282 g |
| mixture of equal parts by weight of xylene and ethylglycol acetate | 108 g |

The coating composition was applied and tested in the same way as practiced in Example I. The baked coating had good mechanical and other properties (see the Tables 1 and 2).

EXAMPLE III

The following components were homogeneously mixed:

| di(neopentyl glycol)phthalate (prepared in accordance with Example A) | 146 g |
| --- | --- |
| di(trimethyl hexane diol)terephthalate (prepared in accordance with Example B) | 146 g |
| hexamethoxymethyl melamine | 102 g |
| 20%-solution of p-toluene sulphonic acid in isopropanol | 10 g |
| titanium dioxide | 282 g |
| mixture of equal parts by weight of xylene and ethylglycol acetate | 121 g |

The coating composition was applied and tested in the same way as practiced in Example I. The baked coating had good mechanical and other properties (see the Tables 1 and 2).

EXAMPLE IV

The following components were homogeneously mixed:

| di(neopentyl glycol)hexahydrophthalate (prepared in accordance with Example D) | 90 g |
| --- | --- |
| di(butane diol)isophthalate (prepared in accordance with Example G) | 180 g |
| hexamethoxymethyl melamine | 120 g |
| 20%-solution of p-toluene sulphonic acid in isopropanol | 10 g |
| titanium dioxide | 282 g |
| mixture of equal parts by weight of xylene and ethylglycol acetate | 98 g |

The sprayable composition was applied and tested as practiced in Example I. The baked coating had good mechanical and other properties (see the Tables 1 and 2).

EXAMPLE V

The following components were homogeneously mixed:

| di(methyl propyl propane diol)isophthalate (prepared in accordance with Example H) | 135 g |
| --- | --- |

| | -continued | |
|---|---|---|
| di(butane diol)phthalate (prepared in accordance with Example E) | | 135 g |
| hexamethoxymethyl melamine | | 120 g |
| 20%-solution of p-toluene sulphonic acid in isopropanol | | 10 g |
| titanium dioxide | | 282 g |
| mixture of equal parts by weight of xylene and ethylglycol acetate | | 112 g |

The sprayable composition was applied and tested as practiced in Example I. The baked coating composition had good mechanical and other properties (see the Tables 1 and 2).

TABLE 1

| | Coating thickness (μm) | Persoz hardness (sec.) | Falling-weight test(kg-cm) coating side | Falling-weight test(kg-cm) back | Conical mandrel test (mm) | Gloss 60° | Gloss 20° |
|---|---|---|---|---|---|---|---|
| Comparative example | | | | | | | |
| 1 | 36 | 360 | 12 | <2 | >104 | 100 | 93 |
| 2 | 34 | 150 | >85 | >85 | <1 | 96 | 92 |
| Example | | | | | | | |
| I | 36 | 340 | >85 | >85 | <1 | 97 | 93 |
| II | 37 | 332 | >85 | >85 | <1 | 96 | 92 |
| III | 35 | 345 | >85 | 60 | <1 | 96 | 93 |
| IV | 35 | 350 | >85 | 85 | <1 | 95 | 93 |
| V | 40 | 345 | >85 | 65 | <1 | 96 | 93 |

TABLE 2

| | Kesternich test | WOM-test | Gloss retention |
|---|---|---|---|
| Comparative Example 3 | 2 | 43 | 65 |
| Example | | | |
| I | 10 | 82 | 94 |
| II | 9 | 84 | 96 |
| III | 9 | — | — |
| IV | 8 | 81 | 82 |
| V | 8 | 82 | 85 |

What is claimed is:

1. A pigment-containing high solids coating composition prepared from a blend of ester diols as binder and a curing agent for the binder, characterized in that as ester diol there is used a mixture of (a) 20–80 mole % of a compound having the general formula:

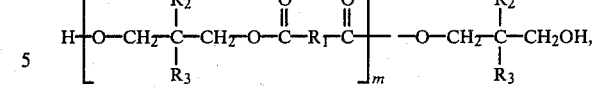

where $R_1$ represents the group formed by abstraction of the two carboxyl groups from a cycloaliphatic and/or aromatic dicarboxylic acid having 8 to 20 carbon atoms and $R_2$ and $R_3$ may be the same or different and represent a hydrogen atom and/or a hydrocarbon group having 1 to 9 carbon atoms, and m is a number of 1–4, and of (b) 80–20 mole % of a compound having the general formula

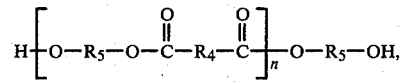

where $R_4$ represents the group formed by abstraction of the two carboxyl groups from a cycloaliphatic and/or aromatic dicarboxylic acid having 8 to 20 carbon atoms, and $R_5$ represents the group formed by abstraction of the two hydroxyl groups from a terminal diol having 4 to 12 carbon atoms in the main chain, and n is a number of 1–4.

2. The coating composition of claim 1 characterized in that the molar ratio of the ester diols is between 3:1 and 1:3.

3. The coating composition of claim 1 characterized in that the molar ratio of the ester diols is between 2:1 and 1:2.

4. The coating composition of to claim 1 characterized in that one of the ester diols is formed up from a cycloaliphatic and/or aromatic dicarboxylic acid containing 8 to 10 carbon atoms and 2,2-dimethyl propane-1,3-diol.

5. The coating composition of claim 1 characterized in that the molar ratio of the hydroxyl groups of the ester diol mixture to the reactive groups of the curing agent is approximately between 0.7 and 1.5.

6. The coating composition of claim 1 characterized in that the amount of pigment in the coating composition is at least 10% by weight, based on the total amount of ester diol.

7. The coating composition of claim 1 characterized in that said curing agent for the binder is a methylol melamine containing 4 to 6 methylol groups per molecule of melamine, at least 3 of said methylol groups being etherified with an alcohol selected from the group consisting of methanol, ethanol, and butanol.

8. The coating composition of claim 1 characterized in that said curing agent for the binder is an N-methylol group- and/or N-methylol ether group-containing amino resin formed by reacting an aldehyde with a compound containing amino groups or amido groups.

* * * * *

UNITED STATES PATENT AND TRADEMARK OFFICE
CERTIFICATE OF CORRECTION

PATENT NO. : 4,279,800
DATED : July 21, 1981
INVENTOR(S) : BOOMGAARD ET AL

It is certified that error appears in the above-identified patent and that said Letters Patent are hereby corrected as shown below:

In the Abstract, between the third last and penultimate lines, add ---aromatic dicarboxylic acid having 8 to 20 carbon atoms, and $R_5$ represents the group formed by abstraction of the two hydroxyl groups from a terminal diol having 4__.

Signed and Sealed this

Third Day of November 1981

[SEAL]

Attest:

GERALD J. MOSSINGHOFF

Attesting Officer — Commissioner of Patents and Trademarks